F. BAILEY.
Improvement in Tree-Protectors.

No. 131,046.                                   Patented Sep. 3, 1872.

UNITED STATES PATENT OFFICE.

FREDERICK BAILEY, OF WESTBOROUGH, MASSACHUSETTS.

IMPROVEMENT IN TREE-PROTECTORS.

Specification forming part of Letters Patent No. 131,046, dated September 3, 1872.

Specification describing a new and useful Improvement in Grub and Insect-Trap, invented by FREDERICK BAILEY, of Westborough, in the county of Worcester and State of Massachusetts.

The object of this invention is to provide convenient means for preventing grubs, worms, and insects ascending fruit and other trees; and it consists in a sack or bag and a box or hoop surrounding the tree, which box or hoop is provided with an inwardly-projecting cordon of bristles or similar material, the arrangement being as hereinafter described.

Figure 1:
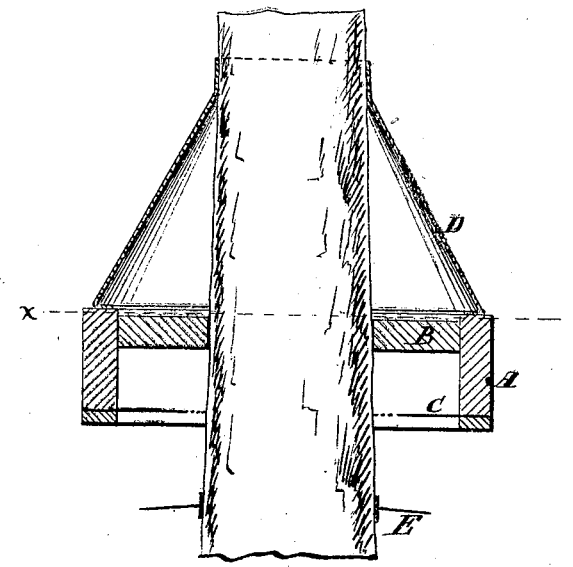
Figure 2:
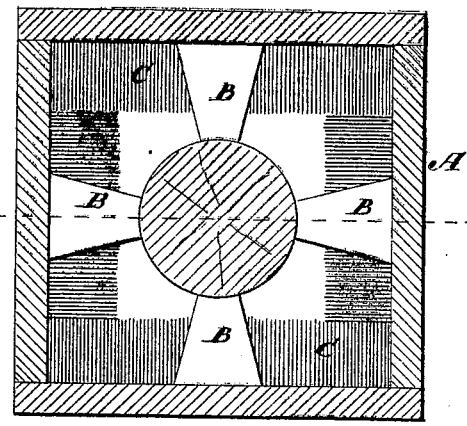

In the accompanying drawing, Figure 1 is a vertical section. Fig. 2 is a horizontal section on the line $x$ $x$ in Fig. 1.

Similar letters of reference indicate corresponding parts.

A represents a wooden box of four or more pieces nailed together around the tree, having on its sides four, more or less, guide pieces, B, to keep the box A at a certain distance from the tree, as seen in the drawing. While these pieces B keep the box in place and away from the tree, or the bristles C a proper distance therefrom, they also serve as bridges, and by their shape induce the grubs, &c., to go directly back to the tree from the bag with a view of finding a place of ascent or descent thereon. Instead of a square box a hoop or band of wood may be used. Projecting inward from the box and surrounding the tree is a cordon of bristles, C, arranged so as to project about horizontally, as seen in the drawing. D is a bag of any textile or flexible material, which is attached to the top of the box at its lower end. Its upper end is gathered in and attached to the tree with tacks or nails, as represented in Fig. 1. On the body of the tree, beneath the box A, is an obstruction, E, which may consist of a flange or collar of fibrous cord with projecting bristles, substantially as seen in the drawing. This flange or collar may be smeared with tar. This obstruction does not prevent entirely the ascent of the worms, grubs, and insects; hence I provide the safeguard above, which has been already described.

Such grubs, worms, &c., as succeed in surmounting the obstruction E will continue crawling until they reach the top of the bag D when they will drop down from the bag and be caught by the cordon of bristles C, which will prevent them from crawling under the box to get upon the outside; such vermin are extremely sagacious and persevering in their efforts to reach the branches and foliage of the tree, and they will surely get over the first obstruction and onto the outside of the box on their way to the branches unless prevented by some formidable barrier. The bag D and the cordon C, made of bristles or equivalent material, form a barrier which they cannot pass.

Having thus described my invention, I claim as new and desire to secure by Letters Patent—

The improved insect-trap, formed of the cordon of bristles C, in combination with the box A B and bag D, as specified.

FREDK. BAILEY.

Witnesses:
ARTHUR G. BISCOE,
J. W. FAIRBANKS.